United States Patent
Stengel et al.

(10) Patent No.: US 9,501,673 B2
(45) Date of Patent: Nov. 22, 2016

(54) METHOD AND APPARATUS FOR TRANSMITTING A SIGNAL BY A RADIO FREQUENCY IDENTIFICATION READER

(71) Applicant: SYMBOL TECHNOGOLIES, LLC, Lincolnshire, IL (US)

(72) Inventors: Robert E. Stengel, Pompano Beach, FL (US); Joshua E Dorevitch, Yad Benyamin (IL); Manuel Gabato, Jr., Elmhurst, IL (US)

(73) Assignee: Symbol Technologies, LLC, Holtsville, NY (US)

( * ) Notice: Subject to any disclaimer, the term of this patent is extended or adjusted under 35 U.S.C. 154(b) by 318 days.

(21) Appl. No.: 14/145,261

(22) Filed: Dec. 31, 2013

(65) Prior Publication Data

US 2015/0186692 A1    Jul. 2, 2015

(51) Int. Cl.
  *G08C 17/00* (2006.01)
  *G06K 7/10* (2006.01)

(52) U.S. Cl.
  CPC . *G06K 7/10009* (2013.01); *G06K 2007/10495* (2013.01)

(58) Field of Classification Search
  CPC .................................................. H04W 52/02
  USPC ......................................................... 370/311
  See application file for complete search history.

(56) References Cited

U.S. PATENT DOCUMENTS

| | | | |
|---|---|---|---|
| 7,382,257 B2 | 6/2008 | Thomas et al. | |
| 7,388,497 B1 | 6/2008 | Corbett et al. | |
| 7,787,568 B2 | 8/2010 | Okunev | |
| 7,890,056 B2 | 2/2011 | Rofougaran et al. | |
| 8,207,825 B2 | 6/2012 | Rofougaran et al. | |
| 8,400,272 B2 | 3/2013 | Duron et al. | |
| 8,421,598 B1 | 4/2013 | Dacus et al. | |
| 2009/0196373 A1 | 8/2009 | Snook | |
| 2010/0148940 A1* | 6/2010 | Gelvin | H04L 67/12 340/286.02 |
| 2011/0206285 A1* | 8/2011 | Hodge | G06F 21/84 382/224 |
| 2011/0304431 A1 | 12/2011 | Farrell et al. | |
| 2012/0051411 A1 | 3/2012 | Duron et al. | |
| 2012/0155347 A1* | 6/2012 | Husted | H04W 52/0229 370/311 |

\* cited by examiner

*Primary Examiner* — Wei Zhao

(57) ABSTRACT

A Radio Frequency Identification (RFID) reader is provided that receives a digital input signal, converts the digital input signal to an analog input signal, and determines whether the digital input signal is an unmodulated signal or is modulated with information. When the digital input signal is modulated with information, the RFID reader filters the analog input signal to produce a filtered analog input signal and transmits the filtered signal. When the digital input signal is an unmodulated signal, the RFID reader bypasses the filtering of the analog input signal to produce an unfiltered analog input signal and transmits the unfiltered analog input signal.

17 Claims, 3 Drawing Sheets

100

METHOD AND APPARATUS FOR TRANSMITTING A SIGNAL BY A RADIO FREQUENCY IDENTIFICATION READER

FIELD OF THE INVENTION

The present invention relates to Radio Frequency Identification (RFID) communication systems and, more particularly, to an RFID reader.

BACKGROUND OF THE INVENTION

Radio Frequency Identification (RFID) communications systems use passive or active RFID tags that communicate with a fixed or handheld RFID reader. In some instances, the reader provides an unmodulated carrier signal that is used to power a passive RFID tag. Communications from the passive RFID tag back to the RFID reader then is accomplished by reflecting the unmodulated carrier signal at a predetermined rate, referred to as a backscatter signal. At other times, the RFID reader may transmit information, modulated onto a carrier, to the RFID tag. When an RFID reader transitions between a state of transmitting an unmodulated carrier signal and a state of transmitting a modulated carrier signal, sideband noise of a modulated reader transmission can leak into a receiver circuitry of the RFID reader, thereby interfering with a low level backscatter signal.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
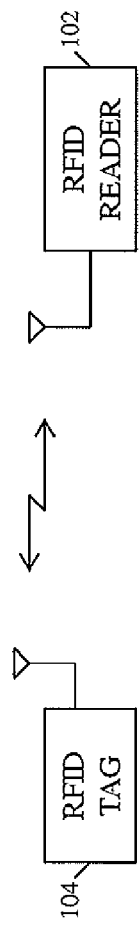
FIG. 1 is a block diagram of a Radio Frequency Identification (RFID) communication system in accordance with an embodiment of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE INVENTION

An RFID reader is provided that receives a digital input signal, converts the digital input signal to an analog input signal, and determines whether the digital input signal is an unmodulated signal or is modulated with information. When the digital input signal is modulated with information, the RFID reader filters the analog input signal to produce a filtered analog input signal and transmits the filtered signal. When the digital input signal is an unmodulated signal, the RFID reader bypasses the filtering of the analog input signal to produce an unfiltered analog input signal, and transmits the unfiltered analog input signal, thereby filtering the signal to be transmitted when filtering is desired and bypassing the filtering when a mere continuous wave signal is being transmitted.

Generally, an embodiment of the present invention encompasses a method for transmitting a signal by an RFID reader. The method includes receiving a digital input signal, converting the digital input signal to an analog input signal, determining whether the digital input signal is an unmodulated signal or is modulated with information, when the digital input signal is modulated with information, filtering the analog input signal to produce a filtered signal and transmitting the filtered signal, and when the digital input signal is an unmodulated signal, bypassing the filtering of the analog input signal to produce an unfiltered analog input signal and transmitting the unfiltered analog input signal.

Another embodiment of the present invention encompasses an RFID reader comprising a processor that is configured to produce a digital input signal and to determine whether the digital input signal is an unmodulated signal or is modulated with information. The RFID reader further comprises transmitter circuitry that is configured to transmit a wireless signal, wherein the transmitter circuitry is configured to receive the digital input signal, convert the digital input signal to an analog input signal, when the digital input signal is modulated with information, filter the analog input signal to produce a filtered analog input signal and transmit the filtered signal, and when the digital input signal is an unmodulated signal, bypass the filtering of the analog input signal to produce an unfiltered analog input signal and transmit the unfiltered analog input signal.

Yet another embodiment of the present invention encompasses a non-transitory computer-readable storage medium having computer readable code stored thereon for programming a processor to perform the steps of providing a digital input signal to transmitter circuitry of a Radio Frequency Identification (RFID) reader, determining whether the digital input signal is an unmodulated signal or is modulated with information, when the digital input signal is modulated with information, control a filtering of an analog version of the digital input signal to produce a filtered analog input signal, and when the digital input signal is an unmodulated signal, control a bypassing of a filtering of the analog version of the digital input signal to produce an unfiltered analog input signal.

The present invention may be more fully described with reference to FIGS. 1-5. FIG. 1 is a block diagram of a Radio Frequency Identification (RFID) system 100 that includes an RFID reader 102 that generates wireless signals in order to read one or more RFID tags 104 (one shown) distributed about a monitored area. In accordance with various embodiments of the present disclosure, RFID tag 104 may be an active tag, that is, a tag which has a self contained power supply or, as is more usually the case, may be a passive tag that requires external excitation when it is to be read or interrogated within a monitored area of RFID reader 102.

Figure 3:
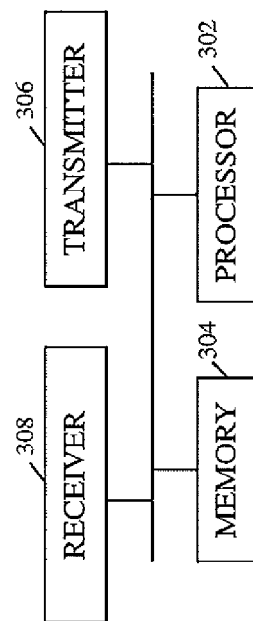
FIG. 3 is a block diagram of the RFID tag of FIG. 1 in accordance with an embodiment of the present invention.
Figure 2:
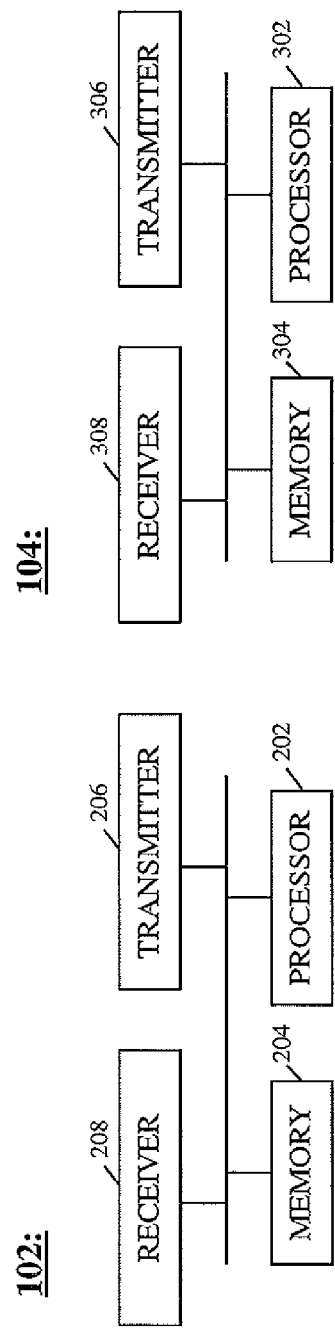
FIG. 2 is a block diagram of the RFID reader of FIG. 1 in accordance with an embodiment of the present invention.

Referring now to FIGS. 2 and 3, block diagrams are provided that illustrate RFID reader 102 and RFID tag 104 in accordance with an embodiment of the present invention. RFID reader 102 generates or emits a radio-frequency (RF) interrogation signal (also sometimes called a polling signal). RFID tag 104 responds to the RF interrogation signal by generating an RF response signal that is transmitted back to RFID reader 102 over an RF channel. The RF response signal is modulated in a manner that conveys identification data (that is, a tag identifier (ID)) for the responding RFID tag back to the wireless tag reader. While reader 102 is referred to herein as an RFID reader, one of ordinary skill in the art realizes that reader 102 may be any type of wireless tag reader. For example, in large-scale applications, such as warehouses, retail spaces, and the like, many types of wireless tags may exist in the environment (or "site") and, likewise, multiple types of wireless tag readers, such as RFID readers, an active tag readers, 802.11 tag readers, Zigbee tag readers, etc., may be used is such an environment and may be linked together by a network controller or wireless switches and the like.

Each of RFID reader 102 and RFID tag 104 includes a respective processor 202, 302, such as one or more microprocessors, microcontrollers, digital signal processors (DSPs), combinations thereof or such other devices known to those having ordinary skill in the art. Each of RFID reader 102 and RFID tag 104 further includes respective radio frequency (RF) transmitter circuitry 206, 306 and respective RF receiver circuitry 208, 308 that are operationally coupled to their respective processors 202, 302 and that provide for wirelessly transmitting and receiving signals by the communication device.

Each of processors 202, 302 is operationally coupled to a respective at least one memory device 204, 304, such as random access memory (RAM), dynamic random access memory (DRAM), and/or read only memory (ROM) or equivalents thereof, that maintains data and programs that may be executed by the processor and that allow the communication device to perform all functions necessary to operate in a wireless communication system. For example, at least one memory device 204 of RFID reader 102 includes instructions for assembling and transmitting an interrogation signal via transmitter circuitry 206 of the RFID reader and for receiving and processing of a backscatter signal received from RFID tag 104 via receiver circuitry 208. Similarly, at least one memory device 304 of RFID tag 104 includes instructions for receiving and processing of an interrogation signal received from RFID reader 104 via receiver circuitry 308 and for assembling and transmitting a backscatter signal to RFID reader 102 via transmitter circuitry 306 of the RFID tag.

As known in the art, when RFID tag 104 is a passive tag, the RFID reader 102 provides an unmodulated carrier signal that is used to power the RFID tag. Communications from the RFID tag back to the RFID reader is accomplished by reflecting the unmodulated RFID reader transmission at a predetermined rate, known as a backscatter signal. However, a problem arises in that this low level backscattered signal transmitted by the RFID tag may compete with sideband noise of a modulated carrier signal that may be transmitted by RFID reader 102 and that leaks into receiver circuitry 208 of the RFID reader.

Figure 4:
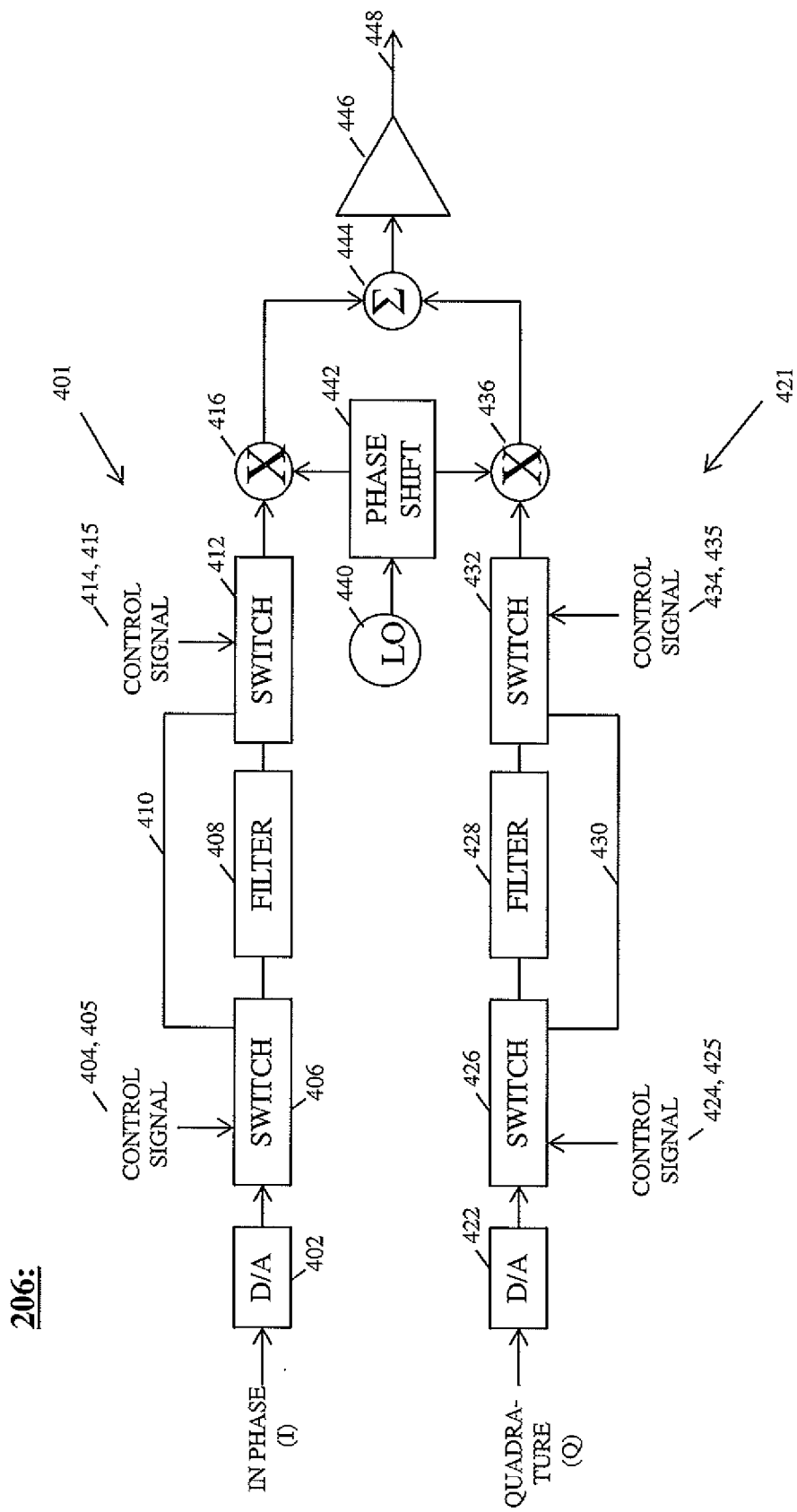
FIG. 4 is a block diagram of a transmitter circuitry of the RFID reader of FIG. 1 in accordance with an embodiment of the present invention.

Referring now to FIG. 4, a block diagram is provided of transmitter circuitry 206 of RFID reader 102 in accordance with an embodiment of the present invention. Transmitter circuitry 206 includes an in-phase (I) signal path 401 and a quadrature-phase (Q) signal path 421. In-phase signal path 401 includes a first digital-to-analog (D/A) converter 402 coupled to a first switch 406. Switch 406 is, in turn, coupled to each of a first filter 408, preferably an anti-aliasing filter, such as a low pass filter or a band pass filter, and to a first filter bypass circuit 410. Each of filter 408 and filter bypass circuit 410 then is coupled to a second switch 412 that is, in turn, coupled to a first modulator 416. Modulator 416 further is coupled to a signal combiner 444, and signal combiner 444 is coupled to a radio frequency power amplifier (RFPA) 446.

Similarly, quadrature-phase (Q) signal path 421 includes a second digital-to-analog (D/A) converter 422 coupled to a third switch 426. Switch 426 is, in turn, coupled to each of a second filter 428, preferably an anti-aliasing filter, such as a low pass filter or a band pass filter, and to a second filter bypass circuit 430. Each of filter 428 and filter bypass circuit 430 then is coupled to a fourth switch 432 that is, in turn, coupled to a second modulator 436. Modulator 436 further is coupled to signal combiner 444, and, as noted above, signal combiner 444 is coupled to RFPA 446.

Figure 5:
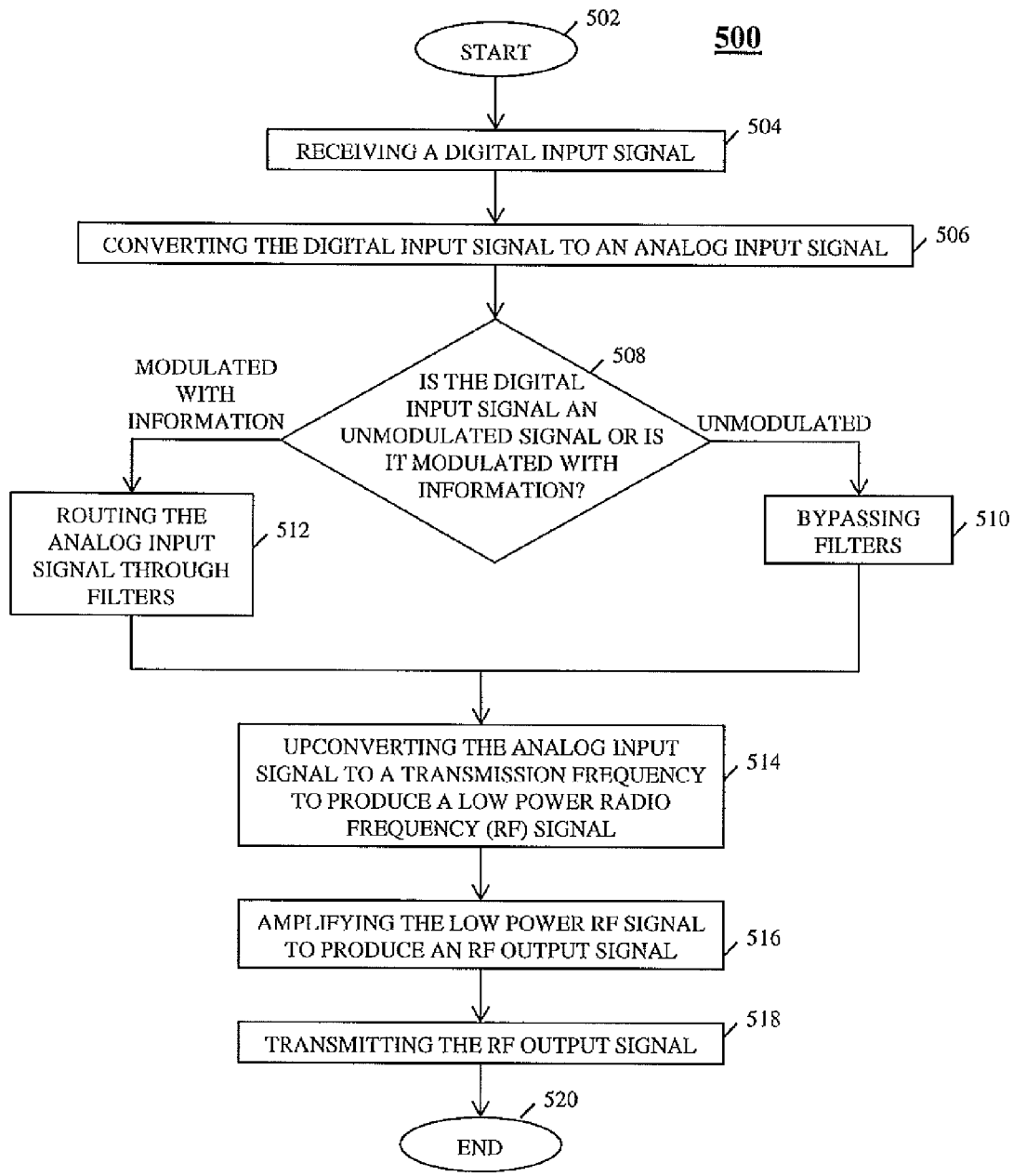
FIG. 5 is a logic flow diagram that illustrates an operation of the RFID reader of FIG. 1 in accordance with an embodiment of the present invention.

Referring now to FIG. 5, a logic flow diagram 500 is provided that illustrates an operation of RFID reader 102 in accordance with an embodiment of the present invention. More particularly, referring now to FIGS. 4 and 5, logic flow diagram 500 begins (502) when a digital input signal that is to be transmitted is provided (504) to transmitter circuitry 206 by processor 202 of RFID reader 102. The digital input signal may be an unmodulated signal, such as an interrogation signal, or may be pre-modulated with information. Further, the digital input signal comprises an in-phase (I) baseband component and a quadrature-phase (Q) baseband component, as known in the art.

Transmitter circuitry 206 routes the in-phase baseband component of the digital input signal to in-phase signal path 401, which in turn routes the in-phase baseband component to first D/A converter 402. Similarly, transmitter circuitry 206 routes the quadrature-phase baseband component of the digital input signal to quadrature-phase signal path 421, which in turn routes the quadrature-phase baseband component to second D/A converter 422. Transmitter circuitry 206 then converts (506) the digital input signal to an analog input signal. That is, D/A converter 402 converts the in-phase baseband component to an analog in-phase signal and D/A converter 422 converts the quadrature-phase baseband component to an analog quadrature-phase signal. D/A converter 402 then routes the analog in-phase signal to switch 406, and D/A converter 422 routes the analog quadrature-phase signal to switch 426.

An operation of each of switches 406, 412, 426, and 434 is controlled by a respective control signal 404/405, 414/415, 424/425, and 434/435 received from processor 202. More particularly, processor 202 determines (508) whether the digital input signal is an unmodulated signal or is modulated with information. When the digital input signal is an unmodulated signal, processor 202 operates switches 406, 412, 426, and 434, to decouple filters 408 and 428 from a path of the analog signals and to couple bypass circuits 410 and 430 to a path of the analog signals, causing the analog signals to bypass (510) filters 408 and 428 and thereby produce unfiltered analog signals. When the digital input signal is modulated with information, processor 202 operates switches 406, 412, 426, and 434 to couple filters 408 and 428 to a path of the analog signals and decouple bypass circuits 410 and 430 from a path of the analog signals, causing the analog signals to be routed (512) to filters 408 and 428 and thereby produce filtered analog signals.

That is, if the digital input signal is an unmodulated signal, then processor 202 controls transmitter circuitry 206 to switch filters 408 and 428 out of the paths of the analog in-phase and quadrature-phase signals and to switch bypass circuits 410 and 430 into the paths of the analog in-phase and quadrature-phase signals. More particularly, if the digital input signal is an unmodulated signal, processor 202 produces a first multiple control signals 404, 414, 424, 434. Control signal 404 causes switch 406 to couple D/A 402 to filter bypass circuit 410, and control signal 414 causes switch 412 to couple filter bypass circuit 410 to modulator 416. Thus, processor 202 causes the analog in-phase signal to bypass filter 408, thereby producing an unfiltered analog in-phase signal, and routes the unfiltered analog in-phase signal to modulator 416. Similarly, control signal 424 causes switch 426 to couple D/A 422 to filter bypass circuit 430 and control signal 434 causes switch 432 to couple filter bypass circuit 430 to modulator 436. Thus, processor 202 causes the analog quadrature-phase signal to bypass filter 428, thereby producing an unfiltered analog quadrature-phase signal, and routes the unfiltered analog quadrature-phase signal to modulator 436.

On the other hand, if the digital input signal is modulated with information, then processor 202 controls transmitter circuitry 206 to switch filters 408 and 428 into the paths of the analog in-phase and quadrature-phase signals and to switch bypass circuits 410 and 430 out of the paths of the analog in-phase and quadrature-phase signals. More particularly, if the digital input signal is modulated with information, processor 202 produces a second multiple control signals 405, 415, 425, and 435. Control signal 405 causes switch 406 to couple D/A 402 to filter 408, and control signal 415 causes switch 412 to couple filter 408 to modulator 416. Thus, the analog in-phase signal is routed to filter 408, which produces a filtered analog in-phase signal, and filter bypass circuit 410 is skipped. Filter 408 then routes the filtered analog in-phase signal to modulator 416. Similarly, control signal 425 causes switch 426 to couple D/A 422 to filter 428, and control signal 435 causes switch 432 to couple filter 428 to modulator 436. Thus, the analog quadrature-phase signal is routed to filter 428, which produces a filtered analog quadrature-phase signal, and filter bypass circuit 430 is skipped. Filter 428 then routes the filtered analog in-phase signal to modulator 436.

Transmitter circuitry 206 then upconverts (514) the analog signals to a transmission frequency based on a carrier signal, producing low power radio frequency (RF) signals according to a signal modulation scheme. That is, modulator 416 receives a carrier signal from a local oscillator 440 and upconverts the analog in-phase signal, received from either filter bypass circuit 410 or filter 408, to a transmission frequency based on the carrier signal, thereby producing a low power in-phase radio frequency (RF) signal according to a signal modulation scheme. A 90° phase shifter 442 is used to provide signals to modulate the in-phase and quadrature-phase components of the input signal. Similarly, modulator 436 receives a carrier signal from local oscillator 440 and upconverts the analog quadrature-phase signal, received from either filter bypass circuit 430 or filter 428, to the transmission frequency based on the carrier signal, producing a low power quadrature-phase RF signal according to the signal modulation scheme. Again, 90° phase shifter 442 is used to provide signals to modulate the in-phase and quadrature-phase components of the input signal.

Transmitter circuitry 206 then combines and amplifies (516) the low power RF signals signal to produce an RF output signal 448 for transmission over the air, and transmits (518) the RF output signal. That is, transmitter circuitry 206 then routes, to signal combiner 444, each of the low power in-phase RF signal produced by modulator 416 and the low power quadrature-phase RF signal produced by modulator 436. Signal combiner 444 combines the low power in-phase RF signal with the low power quadrature-phase RF signal to produce a low power combined signal. Signal combiner 444 then routes the low power combined signal to RFPA 446, which provides power amplification of the low power combined signal to produce an RF output signal 448, which RF output signal is transmitted over the air by transmitter circuitry 206. Logic flow diagram 500 then ends (520).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A method for transmitting a signal by a Radio Frequency Identification (RFID) reader, the method comprising:
   receiving a digital input signal;
   converting the digital input signal to an analog input signal;
   determining whether the digital input signal is an unmodulated signal or is modulated with information;
   when the digital input signal is modulated with information, filtering the analog input signal to produce a filtered signal and transmitting the filtered signal; and
   when the digital input signal is an unmodulated signal, bypassing the filtering of the analog input signal to produce an unfiltered analog input signal and transmitting the unfiltered analog input signal;
   wherein the digital input signal comprises an in-phase baseband component and a quadrature-phase baseband component;
   wherein converting the digital input signal to an analog input signal comprises converting the in-phase baseband component to an analog in-phase signal and converting the quadrature-phase baseband component to an analog quadrature-phase signal;
   wherein filtering the analog input signal to profuce a filtered signal and transmitting the filtered signal comprises:
   filtering the analog in-phase signal to produce a filtered analog in-phase signal;
   filtering the analog quadrature-phase signal to produce a filtered analog quadrature-phase signal;
   combining the filtered analog in-phase signal and the filtered analog quadrature-phase signal to produce a combined signal; and
   transmitting the combined signal.

2. The method of claim 1, wherein filtering comprises filtering the analog input signal with an anti-aliasing filter.

3. The method of claim 2, wherein bypassing the filtering of the analog input signal comprising switching the anti-aliasing filter out of the path of the analog signal.

4. The method of claim 1, wherein transmitting the filtered signal comprises:
   upconverting the filtered signal to produce a low power radio frequency (RF) signal;
   amplifying the low power RF signal to produce an output signal; and
   transmitting the output signal.

5. The method of claim 1, wherein transmitting the unfiltered analog input signal comprises:
   upconverting the unfiltered analog input signal to a transmission frequency to produce a low power radio frequency (RF) signal;
   amplifying the low power RF signal to produce an output signal; and
   transmitting the output signal.

6. The method of claim 1, wherein filtering the analog in-phase signal to produce a filtered analog in-phase signal comprises switching a first filter into a path of the analog in-phase signal and wherein filtering the analog quadrature-phase signal to produce a filtered analog quadrature-phase signal comprises switching a second filter into a path of the analog quadrature-phase signal.

7. The method of claim 1,
   wherein the digital input signal comprises an in-phase baseband component and a quadrature-phase baseband component;
   wherein converting the digital input signal to an analog input signal comprises converting the in-phase baseband component to an analog in-phase signal and converting the quadrature-phase baseband component to an analog quadrature-phase signal;
   wherein bypassing the filtering of the analog input signal to produce an unfiltered analog input signal and transmitting the unfiltered analog input signal comprises:
   bypassing a filtering of the analog in-phase signal to produce an unfiltered analog in-phase signal;
   bypassing a filtering of the analog quadrature-phase signal to produce an unfiltered analog quadrature-phase signal;

combining the unfiltered analog in-phase signal and the unfiltered analog quadrature-phase signal to produce a combined signal; and transmitting the combined signal.

8. The method of claim 7, wherein bypassing a filtering of the analog in-phase signal comprises switching a first bypass circuit into a path of the analog in-phase signal, thereby bypassing a filtering of the analog in-phase signal, and wherein bypassing a filtering of the analog quadrature-phase signal comprises switching a second bypass circuit into a path of analog quadrature-phase signal, thereby bypassing a filtering of the analog quadrature-phase signal.

9. A Radio Frequency Identification (RFID) reader comprising:

a processor that is configured to produce a digital input signal and to determine whether the digital input signal is an unmodulated signal or is modulated with information;

transmitter circuitry that is configured to transmit a wireless signal, wherein the transmitter circuitry is configured to:

receive the digital input signal;

convert the digital input signal to an analog input signal;

when the digital input signal is modulated with information, filter the analog input signal to produce a filtered analog input signal and transmit the filtered signal; and when the digital input signal is an unmodulated signal, bypass the filtering of the analog input signal to produce an unfiltered analog input signal and transmit the unfiltered analog input signal;

wherein the digital input signal comprises an in-phase baseband component and a quadrature-phase baseband component and wherein the transmitter circuitry comprises:

a first digital to analog converter (D/A) that is configured to convert the in-phase baseband component to an analog in-phase signal;

a second D/A that is configured to convert the quadrature-phase baseband component to an analog quadrature-phase signal;

a first filter that is configured to filter the analog in-phase signal to produce a filtered analog in-phase signal;

a second filter that is configured to filter the analog quadrature-phase signal to produce a filtered analog quadrature-phase signal;

a signal combiner that is configured to combine the filtered analog in-phase signal and the filtered analog quadrature-phase signal to produce a combined signal; and wherein the transmitter circuitry is configured to transmit the combined signal.

10. The RFID reader of claim 9, wherein the processor is configured to:

when the digital input signal is an unmodulated signal, produce a first plurality of control signals that cause the transmitter circuitry to bypass the filtering of the analog input signal to produce an unfiltered analog input signal; and when the digital input signal is modulated with information, produce a second plurality of control signals that cause the transmitter circuitry to filter the analog input signal to produce a filtered signal.

11. The RFID reader of claim 10, wherein the transmitter circuitry comprises:

one or more bypass circuits;
one or more filters;

a plurality of switches coupled to each of the one or more bypass circuits and the one or more filters;

wherein, in response to receiving the first plurality of control signals, the plurality of switches couple the one or more bypass circuits into a path of the analog input signal; and wherein, in response to receiving the second plurality of control signals, the plurality of switches couple the one or more filters into a path of the analog input signal.

12. The RFID reader of claim 11, wherein the one or more filters are anti-aliasing filters.

13. The RFID reader of claim 9, wherein the transmitter circuitry comprises:

one or more modulators that are configured to upconvert the filtered signal to produce a low power radio frequency (RF) signal;

a power amplifier that is configured to amplify the low power RF signal to produce an output signal; and wherein the transmitter circuitry transmits the output signal.

14. The RFID reader of claim 9, wherein the transmitter circuitry comprises:

one or more modulators that are configured to upconvert the unfiltered analog input signal to a transmission frequency produce a low power radio frequency (RF) signal;

a power amplifier that is configured to amplify the low power RF signal to produce an output signal; and wherein the transmitter circuitry is configured to transmit the output signal.

15. The RFID reader of claim 9, wherein the processor is configured to:

control a switching of the first filter into a path of the analog in-phase signal; and control a switching of the second filter into a path of the analog quadrature-phase signal.

16. The RFID reader of claim 9, wherein the digital input signal comprises an in-phase baseband component and a quadrature-phase baseband component and wherein the transmitter circuitry comprises:

a first digital to analog converter (D/A) that is configured to convert the in-phase baseband component to an analog in-phase signal;

a second D/A that is configured to convert the quadrature-phase baseband component to an analog quadrature-phase signal;

a first bypass circuit that is configured to bypass a filtering of the analog in-phase signal, thereby producing an unfiltered analog in-phase signal;

a second bypass circuit that is configured to bypass a filtering of the analog quadrature-phase signal, thereby producing an unfiltered analog quadrature-phase signal;

a signal combiner that is configured to combine the bypass analog in-phase signal and the bypass analog quadrature-phase signal to produce a combined signal; and wherein the transmitter circuitry is configured to transmit the combined signal.

17. The RFID reader of claim 16, wherein the processor is configured to:

control a switching of the first bypass circuit into a path of the analog in-phase signal; and control a switching of the second bypass circuit into a path of the analog quadrature-phase signal.

* * * * *